US005651386A

United States Patent [19]

Nir

[11] Patent Number: 5,651,386
[45] Date of Patent: Jul. 29, 1997

[54] DEVICE FOR STORING AND DISCHARGING VISCOUS LIQUID

[76] Inventor: Ari Nir, 2600 Netherlands Ave., Bronx, N.Y. 10463

[21] Appl. No.: 615,811

[22] Filed: Mar. 14, 1996

[51] Int. Cl.$^{6}$ .................................................. F16K 49/00

[52] U.S. Cl. .......................... 137/340; 137/338; 165/142; 165/183

[58] Field of Search .................................. 165/142, 183; 137/13, 338, 340, 828

[56] References Cited

U.S. PATENT DOCUMENTS

| | | | |
|---|---|---|---|
| 1,417,292 | 5/1922 | Andrews | 137/338 |
| 4,657,074 | 4/1987 | Tomita et al. | 165/183 |
| 4,926,830 | 5/1990 | McNelley | 165/142 |

*Primary Examiner*—A. Michael Chambers
*Attorney, Agent, or Firm*—Ilya Zborovsky

[57] ABSTRACT

A device for storing and discharging a viscous liquid comprises a tank adapted to accommodate a viscous liquid, an outer tubular element arranged inside the tank and open into its interior so that the viscous liquid fills an inner chamber of the outer tubular element, an inner tubular element located inside an inner chamber of the outer tubular element and being substantially closed, means for supplying the viscous liquid into the outer tubular element and discharging liquid from the outer tubular element, means for supplying a heating medium into the inner tubular element so that the heating medium inside the inner tubular element gives out heat through a wall of the inner tubular element into the inner chamber of the outer tubular element and therefore to the viscous liquid so as to heat the viscous liquid and to reduce its viscosity, and for discharging the heating medium which has been cooled as a result of giving off the heat, and a plurality of fins arranged on an outer surface of the inner tubular element and extending toward an inner surface of the outer tubular element and spaced from one another in a circumferential direction around the inner tubular element so as to facilitate heat transfer from the wall of the inner tubular element to the viscous liquid inside the outer tubular element.

6 Claims, 3 Drawing Sheets

DEVICE FOR STORING AND DISCHARGING VISCOUS LIQUID

BACKGROUND OF THE INVENTION

The present invention relates to devices for storing and discharging viscous liquids.

Viscous liquids are usually stored in tanks. The fluidity of the viscous liquids and therefore the ease with which they can be pumped decreases sporadically as its temperature falls. Therefore it is important that all viscous liquid storage devices or tanks have to be equipped with heating. There are various types of heating elements provided in the viscous liquid storage devices. It is believed that they can be further improved as to their simplicity of construction, efficiency and easiness of handling.

SUMMARY OF THE INVENTION

Accordingly, it is an object of the present invention to provide a device for storing and discharging viscous liquids, which is a further improvement of the prior art and avoids the disadvantages of the prior art.

In keeping with these objects and with others which will become apparent hereinafter, one feature of the present invention resides, briefly stated, in a device for storing and discharging viscous liquids, which has a storage tank, a substantially vertical tubular element located inside the tank and provided with a viscous liquid supply conduit and a viscous liquid discharge conduit, and an inner tubular element located inside the first mentioned tubular element and provided with conduits for supply of a heating medium and withdrawal of the medium cooled due to a heat exchange with the viscous liquid, wherein the inner tubular element is provided with a plurality of fans extending from its outer surface into the interior of the first outer tubular element.

When the device is designed in accordance with the present invention, it is highly efficient, it has a simple construction, is easy to manufacture and easy to handle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
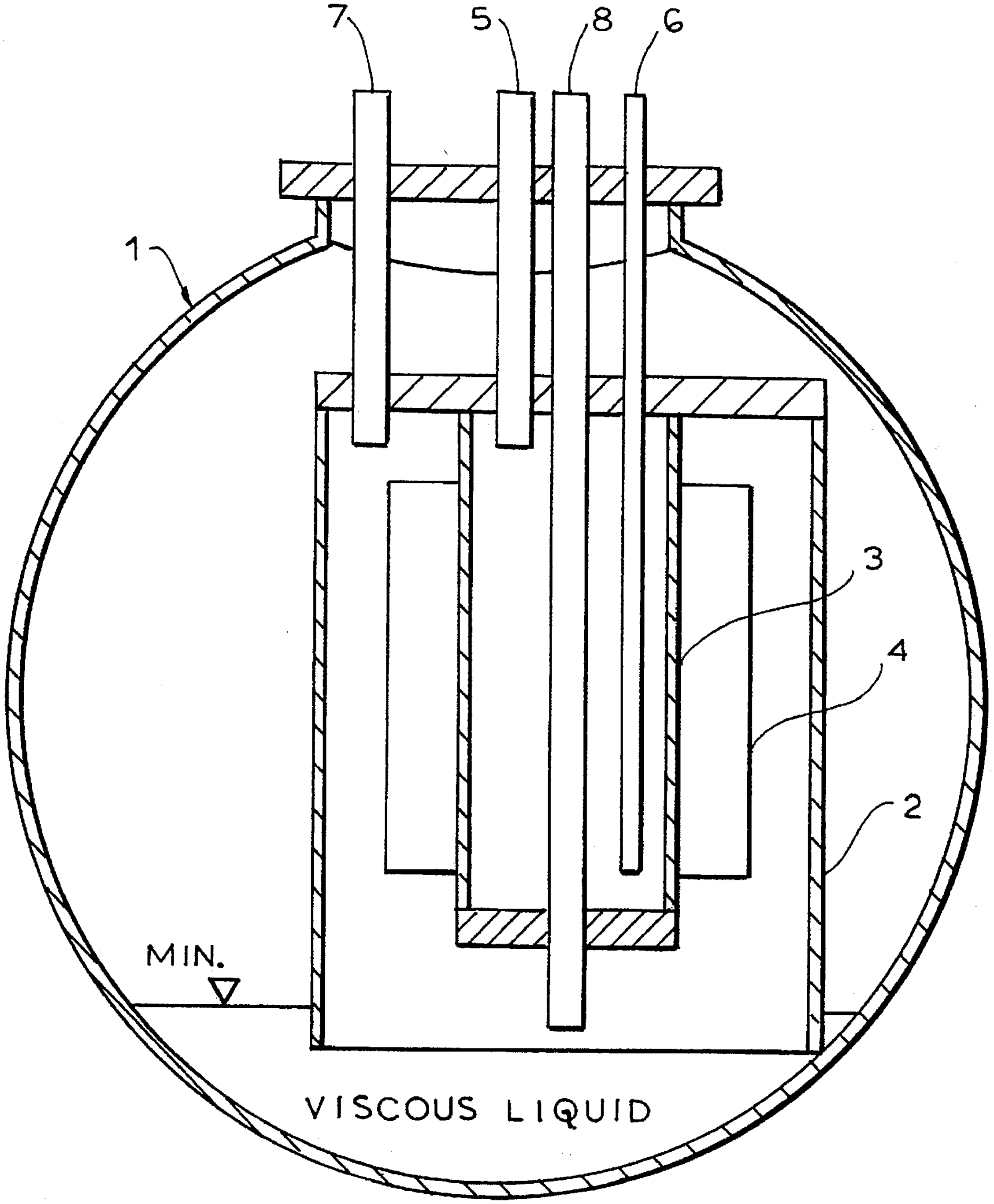
FIG. 1 is a view showing the device for storing and discharging a viscous liquid in accordance with the first embodiment of the present invention.
Figure 3:
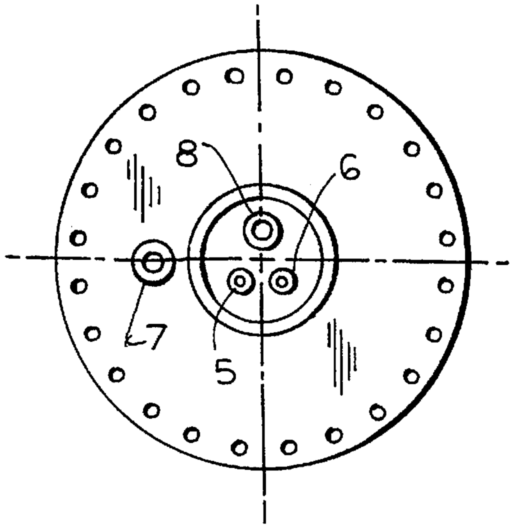
FIG. 3 is a view showing a top cover of the inventive device.
Figure 4:
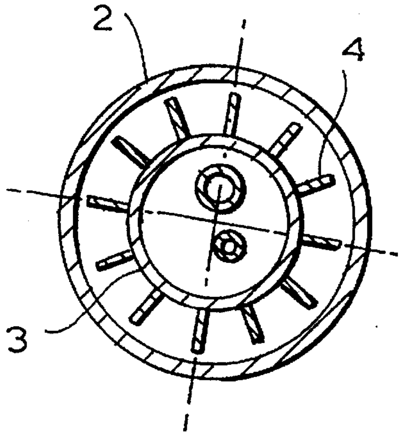
FIG. 4 is a view from above of the inventive device with the cover removed.
Figure 2:
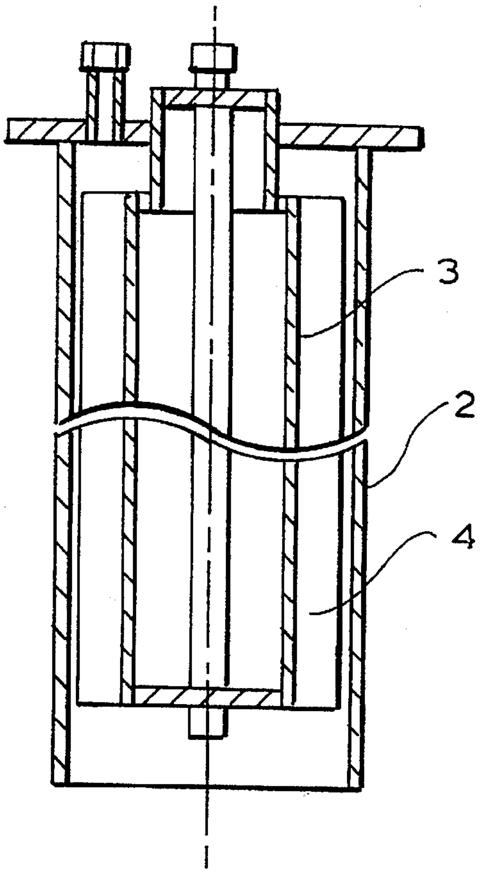
FIG. 2 shows a cross-section of the device in accordance with the present invention.

As can be seen from FIG. 1, a device for storing and discharging viscous liquids includes an outer tank which is identified with reference numeral 1. A viscous liquid for example a heavy fuel oil is stored in the tank 1. The device further has an outer tubular element which is preferably bell-shaped. In other words, the outer tubular element 2 has a tubular lateral shell and an upper cover which closes the shell from above. The tubular element 2 is located in the interior of the tank 1. The device further has an inner tubular element 3 which is closed by the above mentioned cover of the outer tubular element 2 and is also closed from below by an additional bottom, and is closed sideways by the lateral wall. The interior of the outer tubular 2 forms a chamber for heavy fuel oil, while the interior of the inner tubular element 3 forms a chamber for a heating medium.

The device is provided with a plurality of heat conductive fans which are arranged on the outer circumferential surface of the lateral circumferential wall of the inner tubular element 3 and extend substantially radially toward the lateral circumferential wall of the outer tubular element 2 and are spaced from one another in the circumferential direction. A supply conduit 5 supplies a heating medium for example steam, heating liquid, etc. into the heating medium chamber in the interior of the inner tubular element 3, while a discharge conduit 6 withdraws condensate (if the heating medium is steam), a liquid cooled due to the heat exchange with the cold heavy fuel oil (when the medium is hot liquid), etc. A heavy fuel oil supply conduit 8 supplies oil into the tank through the inner chamber of the inner tubular element 3, while a heavy fuel oil discharge conduit 7 is used to withdraw oil from the inner chamber of the outer tubular element 2 and therefore from the tank 1. Corresponding devices for circulating the heavy fuel oil and the heating medium are provided; however, they are not shown in the drawings. They can be formed as conventional pumps, injectors and ejectors, etc.

The device operates in the following manner:

The heavy fuel oil is stored in the tank 1 and fills the inner chamber of the inner tubular element 2. When it is necessary to withdraw heavy fuel oil from the tank 1, it has to be heated. The heating medium is supplied through the heating medium supply conduit 5 into the interior of the tubular element 3. It gives out heat to the lateral circumferential wall of the tubular element 3 and to the fins 4. The heat is further supplied into the heavy fuel oil which is warmed up and viscosity is reduced as a result of warming up. The heavy fuel oil is then withdrawn through the oil withdrawal conduit 7.

Figure 5:
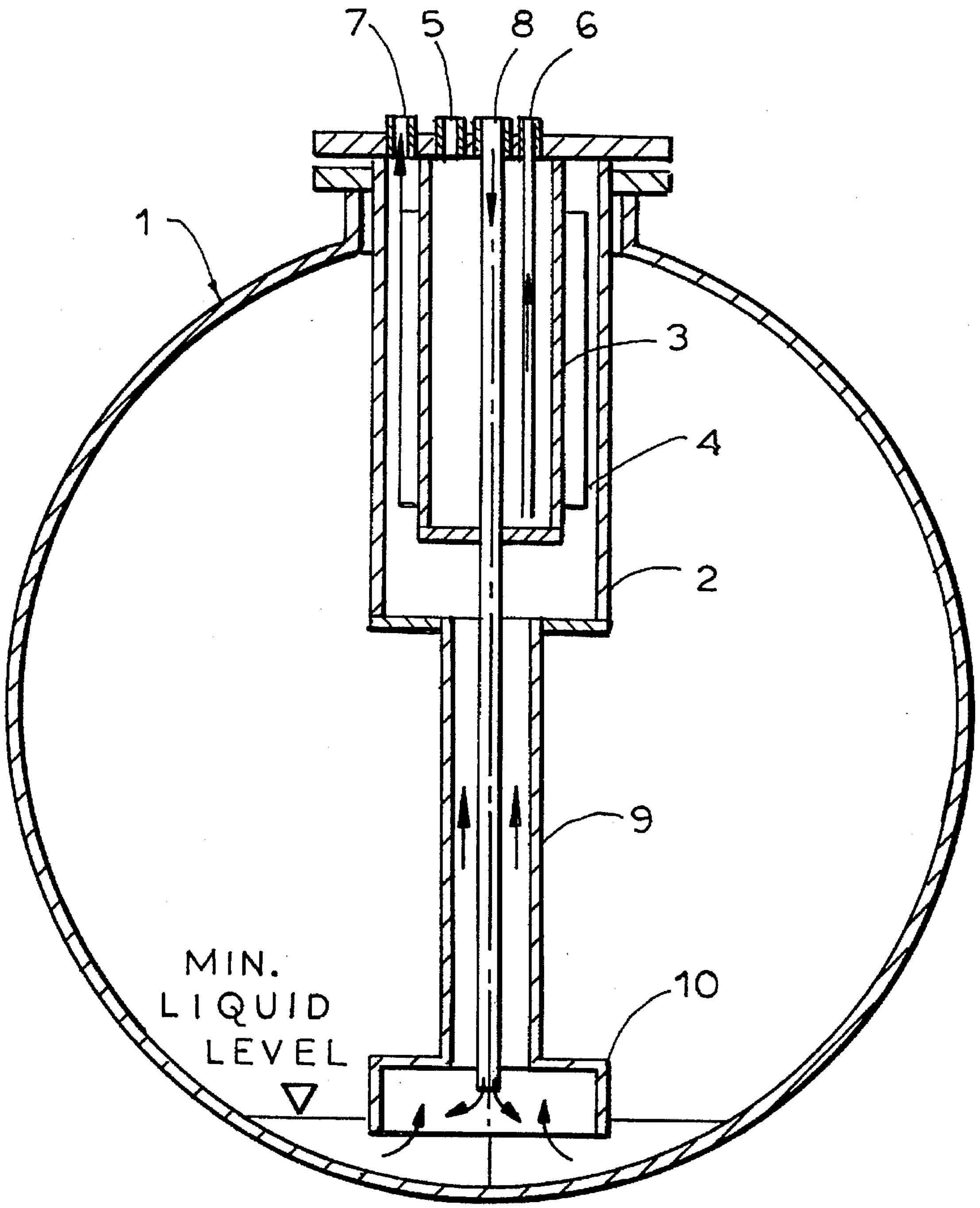
FIG. 5 is a view showing the inventive device in accordance with another embodiment of the present invention.

In another embodiment of the present invention shown in FIG. 5, the outer tubular element is provided with an additional downwardly extending tubular extension 9 having a lower expanded portion 10. The oil supply conduit extends all the way downwardly through the extension 9. In this construction the heavy fuel oil can be collected and withdrawn from the tank 1 even when the oil level is minimal. The expanded portion 10 forms a mixing chamber.

As can be seen from FIG. 5, the outer tubular element is provided with a flange which is placeable on a flange of the tank 1 and connected with it by screws, so that the whole unit including the outer tubular element, the inner tubular element can be easily inserted and mounted in the tank and removed from the tank for example for maintenance purposes without draining the oil from the tank.

The device can be provided in the new tanks as well as mounted in the existing tanks.

It will be understood that each of the elements described above, or two or more together, may also find a useful application in other types of constructions differing from the types described above.

While the invention has been illustrated and described as embodied in a device for storing and discharging viscous liquid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for storing and discharging a viscous liquid, comprising a tank adapted to accommodate a viscous liquid; an outer tubular element arranged inside said tank and open into its interior so that the viscous liquid fills an inner chamber of said outer tubular element; an inner tubular element located inside an inner chamber of said outer tubular element and being substantially closed; means for supplying the viscous liquid into said outer tubular element and discharging liquid from said outer tubular element; means for supplying a heating medium into said inner tubular element so that the heating medium inside said inner tubular element gives out heat through a wall of said inner tubular element into the inner chamber of said outer tubular element and therefore to the viscous liquid so as to heat the viscous liquid and to reduce its viscosity, and for discharging the heating medium which has been cooled as a result of giving off the heat; and a plurality of fins arranged on an outer surface of said inner tubular element and extending toward an inner surface of said outer tubular element and spaced from one another in a circumferential direction around said inner tubular element so as to facilitate heat transfer from the wall of the inner tubular element to the viscous liquid inside the outer tubular element.

2. A device as defined in claim 1, wherein said outer tubular element has a lateral peripheral wall and an upper wall, said inner tubular element having a lateral peripheral wall located inside said lateral peripheral wall, said outer tubular element, a bottom and a top wall formed by said top wall of said outer tubular element.

3. A device as defined in claim 1, wherein said tubular elements have an axis, said fins extend in an axial direction on said outer surface, said fins are elongated in an axial direction and extend radially.

4. A device as defined in claim 1, wherein said outer tubular element has a predetermined inner diameter and is provided with an extension extending from a lower end of said outer tubular element and having an inner diameter which is smaller than the inner diameter of said outer tubular element, said extension extending downwardly substantially to a lower region of said tank.

5. A device as defined in claim 1, wherein said extension has a lower end provided with an expanded portion forming a mixing chamber.

6. A device as defined in claim 1, wherein said outer tubular element has an outer flange, said tank having an outer flange releasably connectable with said outer flange of said outer tubular element, so that said outer tubular element together with said inner tubular element and said flange of said outer tubular element can be connected with said flange of said tank and disconnected from said flange of said tank.

* * * * *